United States Patent [19]
Barmatz

[11] Patent Number: 4,463,606
[45] Date of Patent: Aug. 7, 1984

[54] HIGH TEMPERATURE ACOUSTIC LEVITATOR

[75] Inventor: Martin B. Barmatz, Glendale, Calif.

[73] Assignee: The United States of America as represented by the Administrator of the National Aeronautics and Space Administration, Washington, D.C.

[21] Appl. No.: 526,750

[22] Filed: Aug. 26, 1983

[51] Int. Cl.³ .............................................. F16C 32/00
[52] U.S. Cl. ..................................................... 73/505
[58] Field of Search ........................................... 73/505

[56] References Cited

U.S. PATENT DOCUMENTS 3,882,732  5/1975  Fletcher .............................. 73/505

Primary Examiner—James J. Gill
Attorney, Agent, or Firm—Paul F. McCaul; Thomas H. Jones; John R. Manning

[57] ABSTRACT

A system is described for acoustically levitating an object (12, FIG. 1) within a portion of a chamber (14) that is heated to a high temperature, while a driver (22) at the opposite end of the chamber is maintained at a relatively low temperature. The cold end of the chamber is constructed so it can be telescoped to vary the length ($L_1$) of the cold end portion and therefore of the entire chamber, so that the chamber remains resonant to a normal mode frequency, and so that the pressure at the hot end of the chamber is maximized. The precise length of the chamber at any given time, is maintained at an optimum resonant length by a feedback loop. The feedback loop includes an acoustic pressure sensor (42) at the hot end of the chamber, which delivers its output to a control circuit (44), which controls a motor (36) that varies the length (L) of the chamber to a level where the sensed acoustic pressure is a maximum.

9 Claims, 8 Drawing Figures

4,463,606

HIGH TEMPERATURE ACOUSTIC LEVITATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to acoustic levitation, and more particularly to a system for use with a chamber heated at one portion, which generates an acoustic field of high intensity in the heated portion.

BACKGROUND OF THE INVENTION

The use of acoustic energy to levitate or position an object within a chamber has many uses, especially in satellites to hold objects under almost zero gravity without touching them with a solid support (containerless processing). One important use is to position a solid object while it is being heated to a temperature at which it melts. Typical sound generators cannot withstand the high temperatures at which many glasses and metals melt. One technique for melting an object is to use an elongated chamber and to heat only one end into which the object is placed, with the other end being maintained at a much lower temperature and with the driver connected to the lower temperature end or cold end of the chamber.

One problem that occurs in the use of acoustic energy to position an object in such a chamber, is to maintain sufficient acoustic pressure at resonant conditions to levitate the object. The velocity of sound increases as the temperature of the gas through which it travels increases, and in a chamber with only one end portion heated there is a variation in the sound velocity. It can be difficult to maintain high acoustic pressure levels while the wave length of sound varies in only one chamber portion. With a variable frequency acoustic generator, it is possible to track the varying resonant frequency. However, because of the nonuniform acoustic conditions in the chamber, the pressure at the hot end would not necessarily be the maximum that could be obtained. The problem can be even more difficult where an acoustic generator is used which generates only a single frequency, or which is much less efficient at frequencies away from a preferred frequency. A system which maximized the pressure in the heated region as well as the maintenance of resonant conditions in a chamber while one portion of the chamber was being heated, would be of considerable value in the acoustic levitation of heated objects.

BRIEF SUMMARY OF THE INVENTION

In accordance with one embodiment of the present invention, a method and apparatus are provided for maintaining resonant conditions within a chamber in which one portion thereof is heated to a higher temperature than another portion. One apparatus includes a means for adjusting the length of a cold end of the chamber, where the acoustic generator is positioned. An acoustic pressure sensor is placed in the heated region of the chamber, and its output is delivered to a control circuit. The control circuit controls the means that varies the length of the chamber, to vary the chamber length in a direction to maximize the sensed acoustic pressure, until a peak pressure is sensed. Where the frequency of the acoustic transducer can be varied, both the chamber length and frequency may be varied.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
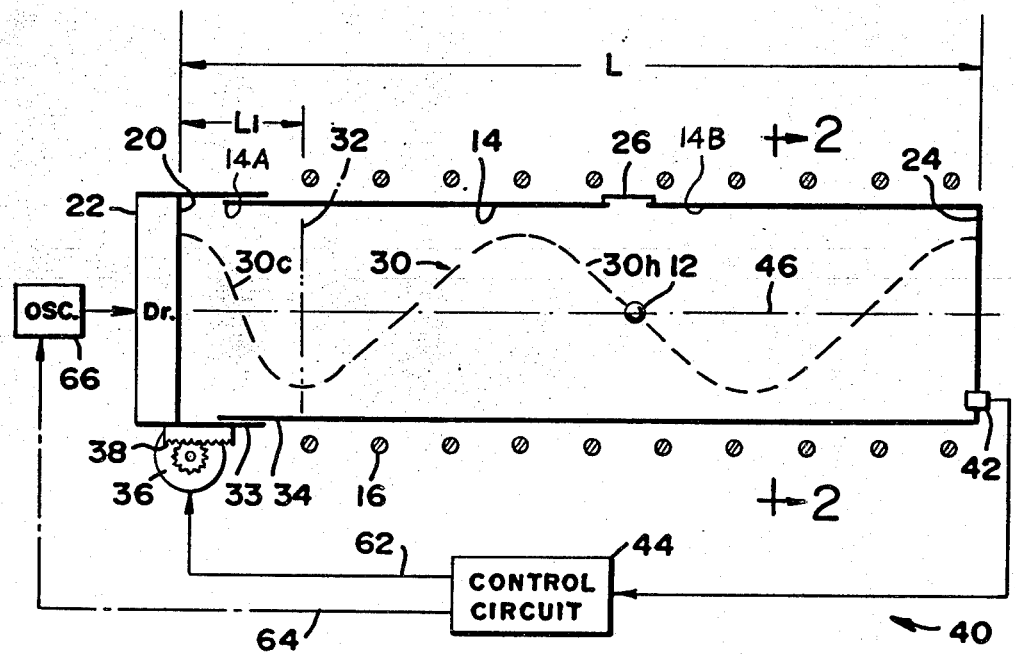
FIG. 1 is a simplified sectional view of an acoustic levitating system constructed in accordance with the present invention.
Figure 2:
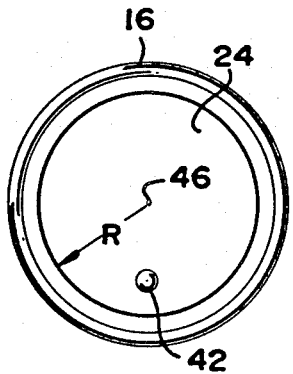
FIG. 2 is a view taken on the line 2—2 of FIG. 1.

FIG. 1 illustrates a system 10 for acoustically levitating an object 12 within a chamber 14 of uniform cross-section, while the object is being heated. The chamber has cold and hot end portions 14A, 14B. A heating coil 16 is wrapped about a portion of the chamber to heat it. The walls of the chamber include a first end wall 20 at which vibrations are generated by an acoustic generator 22, and an opposite second wall 24. The generator 22 (which may include several distinct transducers), generates acoustic waves that are resonant to the length L of the chamber (and also waves resonant to the cross-section), so that the object 12 is supported at a levitation position (which, in the case of a plane wave, is an acoustic pressure node, or minimum) created by the acoustic energy of the waves. An insertion port 26 can be formed in the chamber walls to permit the introduction of the object 12 into the hot end of the chamber. With this system, a sound generator 22, which typically should not be heated to above about 100° C., can be used to suspend an object such as glass which melts at a much higher temperature such as 1000° C.

An important problem that arises in levitating an object wherein a portion is heated, is that as air or other gas is heated, the speed of sound through the heated gas increases. Accordingly, the wavelength of sound of a given frequency increases, and a chamber which was resonant at a certain frequency may not be resonant to that frequency as the chamber is heated or cooled. In FIG. 1, a wave 30 is shown which represents the fourth mode of the chamber, wherein the length L of the chamber equals precisely two wavelengths of the sound. It can be seen that in the cold end portion of the chamber the wavelength at $30c$ is much shorter than at the heated end at $30h$. The precise frequency which will be resonant to a chamber which is heated in only one portion, is very difficult to calculate, because it is difficult to determine the precise temperature at the interface 32 between the cold and hot ends, the change is acoustic impedance and attenuation, and other factors.

In accordance with the present invention, the chamber walls are constructed so that one end 20 of the chamber can be moved towards and away from the other end 24, to alter a dimension such as the length L of the chamber. This can be accomplished by constructing the chamber to include two telescoping sections 33, 34, and by the use of a motor 36 having a gear on its output shaft that drives a rack 38 connected to one of the telescoping sections 32.

Figure 3:
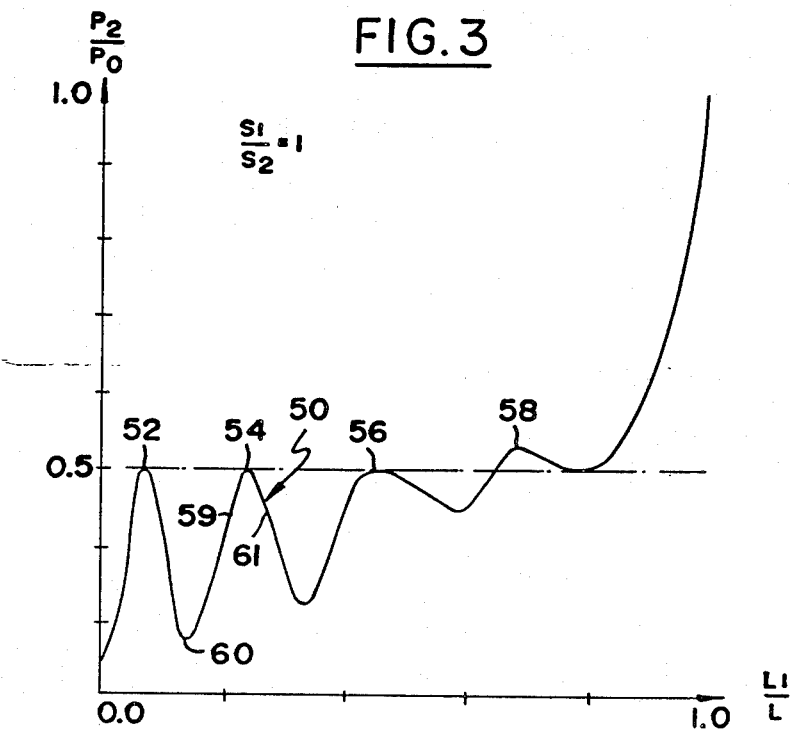
FIG. 3 is a graph showing a variation of pressure ratio with length ratio for the system of FIG. 1.

For an acoustic driver 22 that generates sounds of a given frequency, and with the air or other gas within the chamber heated to approximately predetermined first and second temperatures at its opposite end portions, it is possible to predict the approximate length of the chamber required to achieve a particular resonant mode of acoustic waves within the chamber. However, as discussed above, it is difficult to predict the precise length that is required. In order to maintain the length of the chamber at the precise resonant length, a feedback loop 40 is provided which controls the motor 36 to adjust the length so that a maximum peak pressure is achieved at the heated end of the chamber where the object 12 is to be suspended. The feedback loop includes an acoustic pressure sensor 42, such as a microphone, connected to a control circuit 44. The control circuit drives the motor 36 in a direction that increases the acoustic pressure sensed by the sensor 42, until a peak pressure is achieved. The controller 44 can do this by merely energizing the motor 36 to initially increase the chamber length. If sensed pressure decreases, the motor is energized to decrease the length. The motor will repeatedly reverse direction around a peak pressure. Where the transducer 22 generates only one frequency, this technique can be used to maintain a resonant condition.

Where the frequency of the transducer can be varied, and the length of the chamber also can be varied, it is generally possible to achieve a higher pressure $P_2$ in the hot or levitation end of the chamber, than can generally be obtained by achieving a resonant condition at a randomly chosen chamber length. The pressure $P_2$ at the hot or levitation end of the chamber should be as high as possible. The efficiency of operation of the apparatus at any given conditions, can be expressed as a ratio $P_2/P_0$, where $P_0$ is the pressure generated by the acoustic generator 22 at the pressure sensor 42 prior to heating (when the cross-section is uniform along the length of the chamber and the temperature is uniform). At this time, the acoustic pressure is the same at either end of the chamber. This pressure efficiency $p_2/P_0$ depends to a large extent on the length $L_1$ of the cold or nonlevitation end of the chamber, divided by the length L of the total chamber. FIG. 3 includes a curve 50 showing the variation in the ratio $P_2/p_0$ that is predicted to exist in the chamber, as a function of $L_1/L$.

The curve 50 of FIG. 3 represents the relationship when the fourth acoustic planewave is applied, in which n equals 4, this condition existing when the chamber length equals two wave lengths. Also, the graph 50 represents the condition when the cross section of the tube is the same at the hot and cold ends, the acoustic attenuation is twice as great at the hot end as for the cold end, and the ratio of temperatures at the hot end to cold end equals 4. The temperatures are temperatures above zero. In one example, this condition exists when the temperature T at the cold end is 373° K. (100° C.) and the hot end temperature is 1492° K. (about 1219° C.) which is 4 times $T_1$.

It can be seen from the curve 50 that there are a few distinct lengths of $L_1$, as a percentage of L, that yield high levels of pressure $P_2$ at the heated end of the chamber (as compared to the pressure $P_0$ existing when there is a uniform starting temperature). These maxima are at points 52–58. At these points, the length $L_1$ of the cold end of the chamber, is 7%, 22%, 45%, and 67% of the total chamber length. For length ratio $L_1/L$ of a few (3) percent greater or less than at one of these maxima, such at points 59, 61, the ratio $P_2/P_0$ is much lower. It is desireable to operate the system at a cold chamber length $L_1$ close to one of the maxima values. Where conditions permit, it is even more desirable to use the highest one on these points, such as point 58. In FIG. 1, if the length $L_1$ of the cold end of the chamber is increased to approximately 22% of the total length of the chamber (corresponding to point 54 in FIG. 3), the pressure $P_2$ at the heated end of the chamber will be about 50% of the pressure in the cold end of the chamber, when $T_2$ equals 4 $T_1$. If $L_1$ were only about 14% of L, so the system operated at the point 60 in FIG. 3, then the pressure $P_2$ would be only about 27% of that obtainable at the point 54, or about one half as much.

It should be understood that in FIG. 3, the entire graph 50 represents the conditions existing when the acoustic frequency is resonant to the chamber; that is, for a frequency resonant to the particular length of the chamber whose $L_1/L$ ratio is shown on the graph. If the acoustic frequency which is generated is not resonant to the chamber, then the value $P_2$ will be very low, and generally $P_2/P_0$ then will be below 0.1 or 10%.

Where the generator or transducer 22 in FIG. 1 can generate acoustic waves of a range of frequencies, the controller 44 can be constructed so that it has two output lines 62, 64 respectively connected to the length-changing motor 36 and to a variable frequency oscillator 66 which drives the transducer. The controller 44 initially controls the frequency of the oscillator 66 to any arbitrary value that will be close to the resonant frequency of a particular mode for the chamber. For example, for a chamber of initial length L of 1 foot and room temperature so the velocity of sound is about 1000 feet per second, the frequency may be chosen to be about 2000 Hz so that the wave length is about 0.5 foot to approximate the fourth resonant mode. The control circuit 44 may initially control the oscillator 66 to generate a frequency of 1900 Hz, and then slowly increase the frequency while monitoring the output of the acoustic pressure sensor 42. If the output of the sensor 42 increases, then the frequency to the oscillator 66 continues to increase until the sensor 42 notes a decrease. The frequency of the oscillator 66 is then temporarily kept constant. The control circuit 44 then switches to another mode wherein it energizes the motor 36 to vary the length of the chamber to increase it by a predetermined increment. The controller 44 then switches operation to vary the frequency of the oscillator until resonance is achieved at the new length of the chamber. At resonance, the output of the sensor 42 is compared to the output achieved at the earlier length, and if the output is greater, then the control circuit switches to energize the motor 36 to again incrementally increase the length of the chamber. If the output of the sensor 42 is lower than it was at the previous resonant condition, then the motor 36 is energized to decrease the length of the chamber by a predetermined increment.

By thus operating the control circuit 44, the pressure $P_2$ at the hot or levitation end of the chamber is repeatedly monitored to determine its level at different lengths of the chamber, when there are different ratios of $L_1/L$, the frequency being adjusted to be resonant at each new length of the chamber. After a period of such adjustments, the length ratio $L_1/L$ will be at a maximum. Such repeated variation of frequency and length of the chamber can be continued while the levitation end of the chamber is heated to the desired temperature, and throughout such heating the length ratio $L_1/L$ will be at an optimum level. When the chamber is finally heated to the working temperature where $T_2$ equals 4 $T_1$, the chamber length will be at one of the maxima 52, 54, 56, 58 shown in FIG. 3 (the particular maximum depends on the starting ratio $L_1/L$).

The graph 50 of FIG. 3 can be derived by experimentation or by calculation. The ratio $P_2/P_0$ can be estimated from the equation:

$$\frac{P_2}{P_0} = \frac{\cosh B_1 \sinh a_1 (L_1 + L_2)}{\cosh B_2 \sinh\left[\left(a_1 + \frac{j2\pi f}{c_1}\right)L_1 + B_1\right]}$$

where $P_2$ is acoustic pressure at the levitation end of the chamber when the hot end of the chamber reaches its working temperature, $P_0$ is acoustic pressure at the levitation end when the temperature is uniform in the chamber, cosh and sinh respectively represent the hyperbolic cosine and sine of a quantity, $B_1$ is approximately $-2\ f\pi L_1/c_1$, $B_2$ is approximately equal to $a_2 L_2 + j2\pi f\ L_2/c_2$, $a_1$ is the acoustic attenuation in the cold end of the chamber and equals about 0.001 for a typical chamber under the temperature conditions given in the foregoing example, $a_2$ is the acoustic attenuation in the hot end and equals about 0.002 in the foregoing example, $L_1$ is the length of the cold end of the chamber, $L_2$ is the length of the hot end or levitation end $(L-L_1=L_2)$, j is $\sqrt{-1}$, f is the resonant frequency, and $c_1$ and $c_2$ respectively represent the velocities of sound in the cold and hot ends of the chamber. Each point of a curve such as 50 in FIG. 3 can be calculated by assuming a given ratio of $L_1/L$ and calculating the resulting $P_2/P_0$, using a resonant frequency f determined from the expression:

$$\cot(2fL_1Yc_1) = R\cot(2fL_2/c_2)$$

where $R = (r_2 c_2/s_2)/(r_1 c_1/s_1)$.

In many practical applications, an acoustic generator with an essentially constant frequency is used in order to produce very high acoustic output levels. In these situations, the oscillator 66 of FIG. 1 will always deliver a particular frequency, but the length $L_1$ of the chamber as a ratio of the total chamber length L will be adjusted so that there will be resonant conditions. In order to maintain resonant conditions that are close to a maximum, such as at points 52, 54, 56, or 58 of FIG. 3, the initial overall length of the chamber is chosen so that at the final operating condition where the hot end of the chamber reaches its final high temperature, the system will be operating close to one of the points 52-58. For example, the fixed frequency transducer may be replaced with a variable frequency transducer of lower power, and the system of FIG. 1 may be operated under temperature conditions simulating those expected to be encountered when the fixed frequency output transducer is to be used. In addition, the wall 24 of the hot region may be moveable slightly to vary the overall length of the chamber L to various settings without changing the length $L_1$. The wall system may be operated with the wall 24 at various positions, until an optimum operating point on the graph of FIG. 3 is achieved for the transducer 22 driven at the predetermined frequency. The wall 24 then may be maintained at that position and the high-output fixed-frequency transducer may be substituted for the variable frequency transducer. Furthermore, the entire chamber may be moved in and out of the furnace coils to vary $L_1/L$.

In all cases, the object 12 can be positioned in the chamber through the insertion port 26 either while the levitation end of the chamber is cold or is hot. It may be noted that for certain modes such as planewave modes, that in order to prevent the levitated object from drifting against the wall of the chamber, acoustic, electrostatic, or other forces may be applied normal to the axis 42 of the tube.

Figure 4:
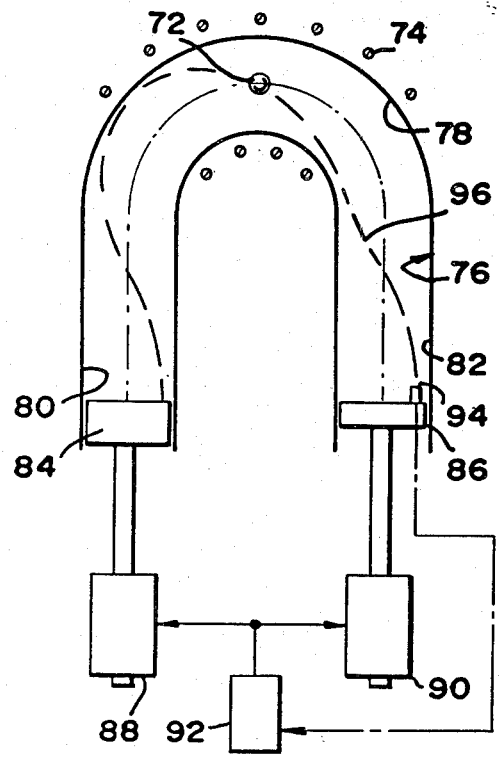
FIG. 4 is a perspective view of an acoustic levitating apparatus constructed in accordance with another embodiment of the invention.

FIG. 4 illustrates another system 70 which is used to heat an object 72 uniformly, by using a heating element 74 that applies heat to the object from all directions. In this case, the chamber 76 within which the object is levitated, is of U-shape. Only a middle portion 78 of the chamber is heated, while the opposite ends 80, 82 remain cold. A transducer 84 is coupled to one of the ends, and a simple flat wall 86 is coupled to the other end of the chamber. Both the transducer 84 and wall 86 are moveable in and out of a corresponding end of the chamber, to adjust the length of the chamber. This is accomplished with actuators 88, 90 controlled by a control circuit 92 connected to an acoustic pressure sensor 94. Acoustic waves will propagate along the length of the chamber, as measured along a U-shaped path, so long as the wave length of the wave 96 is not too small compared to the length of the chamber. The transducer or transducers 84 can also apply a cylindrical chamber mode to levitate the object 72 so it does not touch a wall of the chamber.

Figure 5:
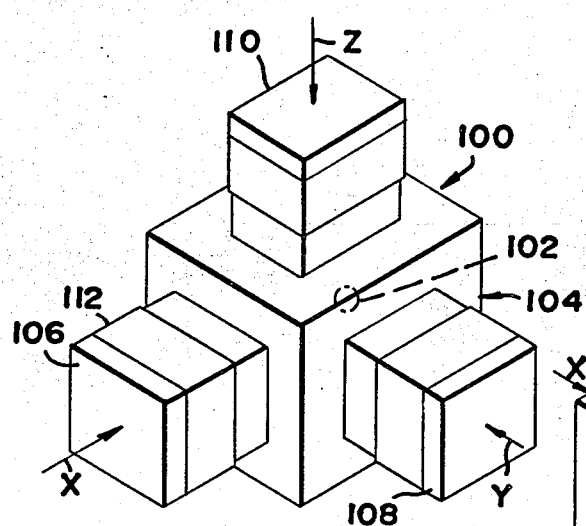
FIG. 5 is a perspective view of another embodiment of an acoustic levitation apparatus.

FIG. 5 illustrates another system 100 in which an object 102 is levitated within walls 104 that form a chamber, wherein three transducers 106, 108, and 110 are provided to levitate the object along three mutually perpendicular directions. Each of the transducers, such as 106, is connected to a chamber portion 112 which can telescope within a similarly sized chamber portion, to vary the length of the entire chamber along each of the three directions X, Y, and Z.

Figure 6:
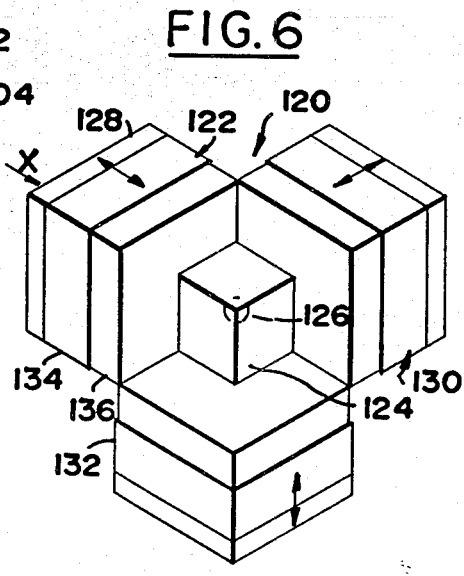
FIG. 6 is a perspective view of another embodiment of an acoustic levitation apparatus.

FIG. 6 illustrates another levitation system 120 somewhat similar to that of FIG. 5, except that the cold or nonlevitation end such as 122 is of much greater cross sectional area than the corresponding hot end or levitation end 124 of the chamber where the object 126 is levitated. The advantage of this arrangement is that, for a given pressure $P_1$ produced by a transducer 128 at the nonlevitation end of the chamber, a much higher pressure is created at the opposite end 124 of the chamber which is of smaller cross sectional area. In a system of FIG. 6, there are three nonlevitation ends 122, 130, and 132, each having a wall 134 which is moveable with respect to another wall 136 to vary the length of the nonlevitation end of the chamber.

Figure 7:
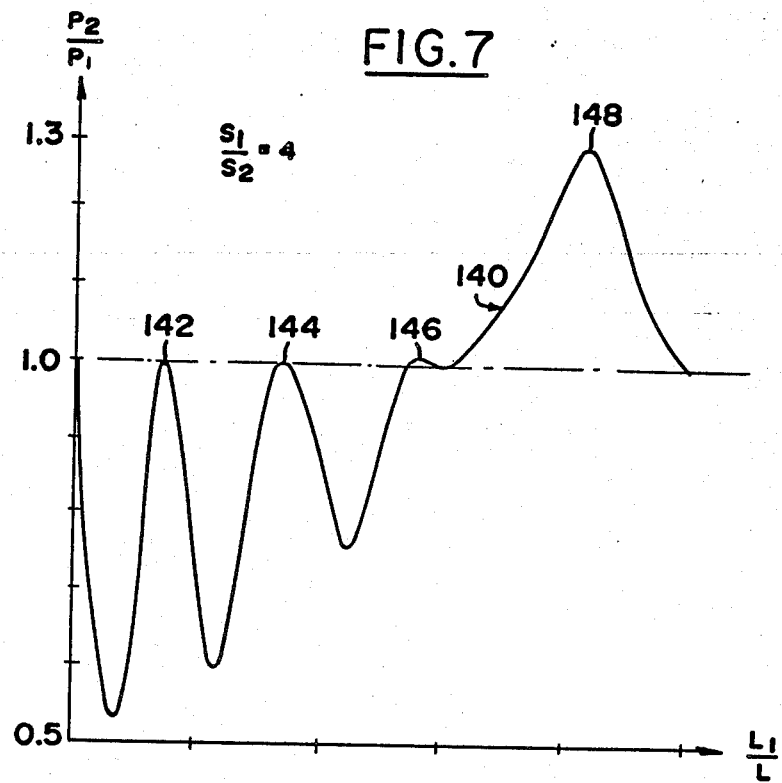
FIG. 7 is a graph similar to FIG. 3, for the system of FIG. 6 in which the transducer end of the chamber has 4 times the cross-sectional area of the levitation end.
Figure 8:
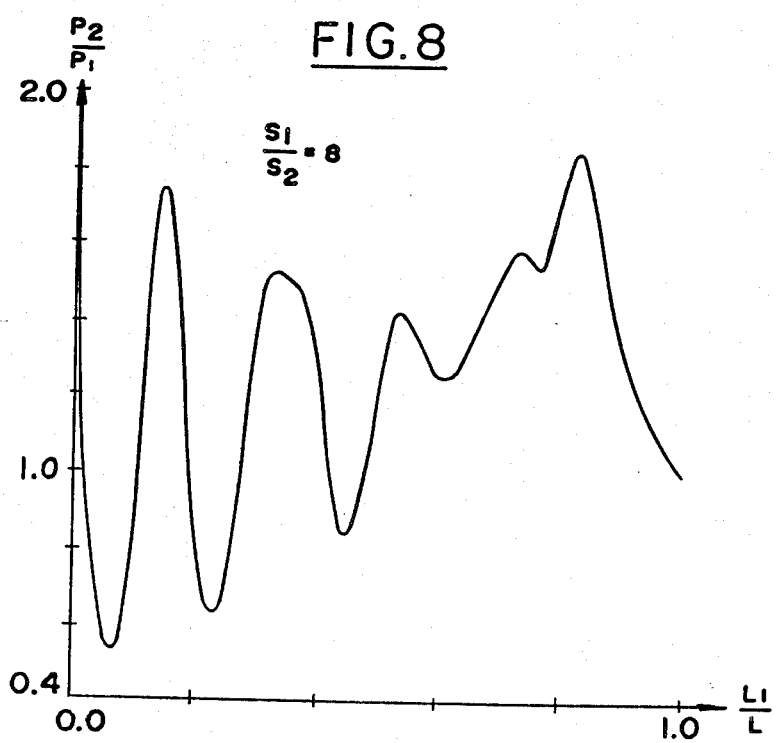
FIG. 8 is graph similar to FIG. 7, but wherein the ratio of cross-sections is 8 to 1.

FIG. 7 illustrates the variation in pressure $P_2$ as a percentage of the pressure $P_1$ generated by one of the transducers such as 128 for the system of FIG. 6. The curve 140 represents the variation in acoustic pressure for the same conditions as for the curve of FIG. 3, except that the cross sectional area $S_1$ of the large end, such as 122, of the chamber is four times the cross sectional area of the corresponding levitation end 124 of the chamber. It can be seen that there are four points of maximum pressure shown at points 142, 144, and 148, and that the value of $P_2$ is 1 to 1.3 times $P_1$ at these points. Thus, the pressure in the levitation end of the chamber is about twice that achieved for the system of FIG. 1, where the output of the transducer is at a predetermined level. Of course, to achieve the same high output for a large cross sectional area, it is necessary to use a large transducer or many smaller ones, all of which take more power than a single small transducer driver at the same acoustic pressure output level. FIG. 8 illustrates the same situation as in FIG. 7, but wherein the ratio $S_1/S_2$ of cross sectional areas equals 8.

Thus, the invention provides a method and apparatus for levitating an object within a chamber, where only the levitation portion of the chamber will be heated to a temperature much different (higher or lower) than that of another portion where the acoustic generator lies. This can be accomplished by using a chamber in which one of the end walls can be moved towards and away from the other. Also a feedback loop can be provided to vary the length of the chamber to maintain resonance of the chamber. When used in conjunction with a variable frequency transducer, the feedback loop can maintain resonance at a chamber length which produces a maximum pressure at the levitation end of the chamber. It should be noted that while the simplest modes to describe are plane waves, other modes can be used which depend not only on the length of the chamber but also on its transverse dimensions (width and/or height). Such other modes are especially useful to levitate or hold the object so it does not touch the side walls of the chamber.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for acoustically levitating an object in a high temperature environment by the use of an acoustic generator lying in a colder environment, comprising:
    walls forming a chamber having first and second opposite end walls separated by the length of the chamber, said chamber having a first end portion adjacent to said first end wall and having levitation portion spaced from said first end wall;
    means operable to adjust the length of said chamber;
    means for applying heat to said levitation portion to raise its temperature above that of said first end portion;
    an acoustic generator coupled to said chamber substantially at said first end wall to apply sound waves thereat to pass along the length of the chamber;
    an acoustic pressure sensor coupled to the chamber; and
    a feedback loop controller means responsive to said pressure sensor, for operating said length adjusting means to obtain a maximum acoustic pressure at said sensor.

2. The apparatus described in claim 1 wherein:
    said chamber includes first and second end portions which respectively end in said first and second end walls, said second end portion forming said levitation portion;
    said acoustic generator has a variable frequency output; and
    said feedback controller means also varies the frequency of said acoustic generator so it is resonant to the length of the chamber, and said feedback controller adjusts the ratio $L_1/L$ of the length of the first end portion to the entire length of the chamber, to an $L_1/L$ ratio at which the pressure $P_2$ at the second end portion of the chamber is substantially at a maximum.

3. The apparatus described in claim 1 wherein:
    said chamber is U-shaped, with a pair of opposite legs and a generally curved connecting section, said connecting section forming said levitation portion and the ends of said legs forming said first and second opposite end walls; and
    said means for applying heat applies heat to said connecting section of said U-shaped chamber.

4. The apparatus described in claim 1 wherein:
    said chamber includes first and second end portions which respectively end in said first and second end walls, said second end portion forming said levitation portion;
    said first end portion of said chamber has a cross-sectional area greater than that of said second end portion.

5. Apparatus for acoustically levitating an object in a high temperature environment by the use of an acoustic generator lying in a colder environment, comprising:
    walls forming a chamber having first and second opposite end walls separated by the length of the chamber, said chamber having a first end portion adjacent to said first end wall and having a first end portion adjacent to said first end wall and having a levitation portion spaced from said first end wall;
    means for applying heat to said levitation portion to raise its temperature above that of said first end portion;
    a variable frequency acoustic generator coupled to said chamber substantially at said first end wall to apply sound waves thereat to pass along the length of the chamber;
    an acoustic pressure sensor coupled to the chamber; and
    a feedback loop controller means responsive to said pressure sensor, for varying the frequency of said acoustic generator to obtain a maximum acoustic pressure at said sensor.

6. A method for acoustically suspending an object in a high temperature environment, comprising:
    heating a levitation portion of a chamber that has opposite end walls whose spacing can be varied, said levitation portion being spaced from a first end of said chamber;
    establishing an object in said levitation portion;
    applying acoustic energy to said first end of said chamber; and
    varying the length of said chamber as the temperature of said levitation portion is varied, to continually establish a chamber length that is resonant to said acoustic energy.

7. The method described in claim 6 wherein:
    said step of varying includes sensing the acoustic pressure in said levitation portion of said chamber and varying the length of the chamber in a direction which increases the sensed acoustic pressure until a maximum pressure is sensed.

8. A method for acoustically levitating an object comprising:
establishing said object in the levitation portion of a chamber which has a length direction annd opposite end walls;
heating said levitation portion of said chamber to a temperature greater than that of a colder portion of said chamber; and
applying acoustic energy to said colder portion of said chamber, of a frequency which is resonant to at leat one dimension of the chamber;
the chosen length $L_1$ of said colder portion of said chamber divided by the length L of the chamber as measured between said end walls, is chosen so the acoustic pressure $P_2$ in the heated portion of the chamber divided by acoustic pressure $P_0$ measured in the same portion of the chamber but when the chamber is not heated, is greater than is achieved at length ratios $L_1/L$ that are only a few percent greater or smaller than at said chosen ratio.

9. The method described in claim 8 including:
varying the frequency of the applied acoustic energy so it is always close to the resonant frequency of the chamber, and varying the ratio of the length of the cold portion of the chamber to the length of the heated levitation portion, to obtain a maximum acoustic pressure in the levitation portion.

* * * * *